United States Patent
Vasquez

(10) Patent No.: US 8,820,944 B2
(45) Date of Patent: Sep. 2, 2014

(54) SELECTABLE THROW RATIO IMAGE PROJECTION DEVICE

(71) Applicant: Texas Instruments Incorporated, Dallas, TX (US)

(72) Inventor: Jose S. Vasquez, Melissa, TX (US)

(73) Assignee: Texas Instruments Incorporated, Dallas, TX (US)

( * ) Notice: Subject to any disclaimer, the term of this patent is extended or adjusted under 35 U.S.C. 154(b) by 18 days.

(21) Appl. No.: 13/659,313

(22) Filed: Oct. 24, 2012

(65) Prior Publication Data

US 2013/0286361 A1    Oct. 31, 2013

Related U.S. Application Data

(60) Provisional application No. 61/551,013, filed on Oct. 25, 2011.

(51) Int. Cl.
   *G03B 21/28*   (2006.01)
   *G03B 21/14*   (2006.01)
   *G03B 21/00*   (2006.01)

(52) U.S. Cl.
   CPC .............. *G03B 21/142* (2013.01); *G03B 21/28* (2013.01); *G03B 21/008* (2013.01)
   USPC .................. 353/99; 353/30; 353/31; 353/37; 353/38; 353/97; 348/744; 348/746

(58) Field of Classification Search
   USPC ........... 353/30, 31, 37, 38, 39, 69, 70, 79, 88, 353/97, 99, 101, 119; 359/642, 654, 649, 359/716, 745, 749, 761, 784; 348/743–747, 348/E5.142, E5.137; 349/5, 7–9
   See application file for complete search history.

(56) References Cited

U.S. PATENT DOCUMENTS

| | | | | |
|---|---|---|---|---|
| 5,365,288 A | * | 11/1994 | Dewald et al. | 353/98 |
| 5,914,818 A | * | 6/1999 | Tejada et al. | 359/663 |
| 6,008,951 A | * | 12/1999 | Anderson | 359/677 |
| 6,604,829 B2 | * | 8/2003 | Rodriguez, Jr. | 353/79 |
| 2004/0141157 A1 | * | 7/2004 | Ramachandran et al. | 353/70 |
| 2011/0176114 A1 | * | 7/2011 | Schuck et al. | 353/8 |
| 2012/0008102 A1 | * | 1/2012 | Destain | 353/69 |

* cited by examiner

*Primary Examiner* — Sultan Chowdhury
(74) *Attorney, Agent, or Firm* — Warren L. Franz; Wade J. Brady, III; Frederick J. Telecky, Jr.

(57) ABSTRACT

A portable image projection device has a housing with first and second members pivotable between device folded and unfolded positions. First lens optics mounted within the first member are configured for projecting light modulated by a spatial light modulator along an optical axis through a first aperture with a first throw ratio with the device in the folded position. A second lens optics element movably mounted within the first member is configured for selective movement between positions of non-intersection and intersection with the optical axis. The second lens optics element is configured for cooperating with at least part of the first lens optics for projecting the light modulated by the spatial light modulator along the optical axis through a second aperture with a second throw ratio less than the first throw ratio with the device in the unfolded position.

19 Claims, 6 Drawing Sheets

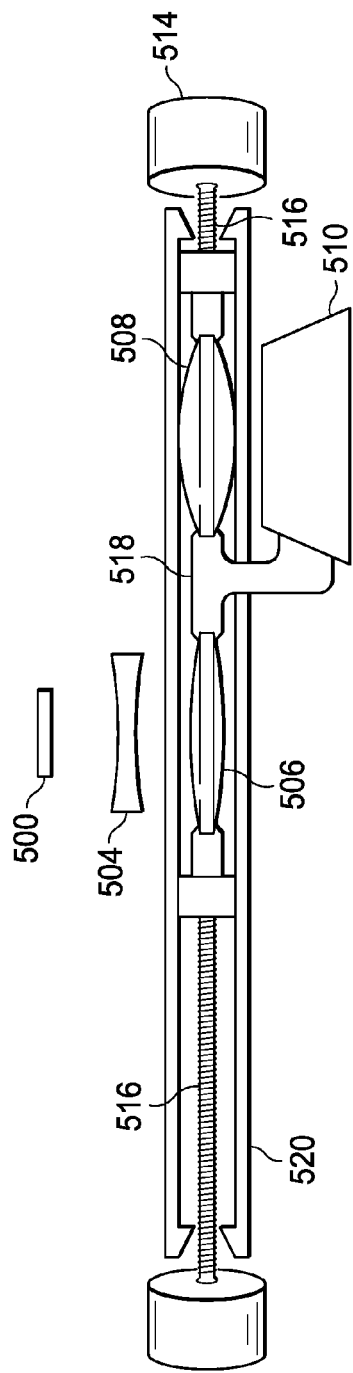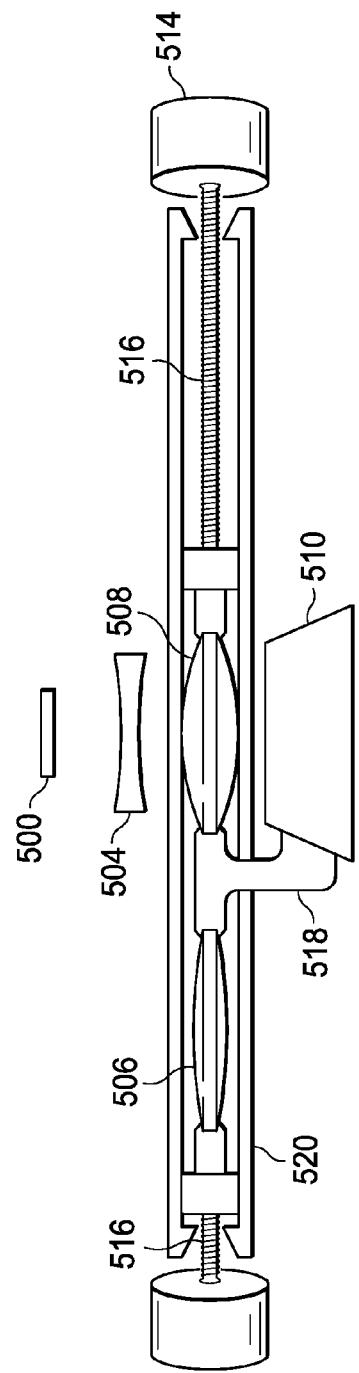

SELECTABLE THROW RATIO IMAGE PROJECTION DEVICE

This application claims the benefit of Provisional Application No. 61/551,013, filed Oct. 25, 2011, the entirety of which is hereby incorporated by reference.

This relates to image projection devices for projecting images with different throw ratios.

BACKGROUND

An image projector utilizing a spatial light modulator, such as a digital micromirror device (DMD) or a liquid crystal-on-silicon (LCOS) device, includes an array of pixel light modulator elements which are individually addressable to modulate light according to settings based on image input data for pixel color and intensity. The light modulated by the array elements is projected through optical elements to collectively form an image at a given throw ratio onto an imaging surface, such as a wall, flat surface or screen.

Throw ratio (D/W) is the throw distance (D) from the projector lens to the screen, divided by the width (W) of the projected image. Different lens systems provide different throw ratios. For projectors with zoom lenses, throw ratio may be varied within a given range. However, for projectors with fixed lenses, throw ratio is normally also fixed. To change throw ratio for such projectors, either lens substitutions are made or supplemental lenses are added. For projection over longer distances, such as from the back of an auditorium to a vertical screen on a front wall, projection optics are used that form images with longer throw ratios, e.g., >2.0. If the throw ratio is too short, the projected image may be unclear. For projection over shorter distances, such as for projection from a cell phone, laptop or other portable device onto a horizontal tabletop or nearby wall surface, projection optics are used that form images with shorter throw ratios, e.g., <1.1. If the throw ratio is too long, particularly with microdisplay and portable fixed resolution devices, the image may appear pixelated.

SUMMARY

A disclosed image projection device has fixed optical elements selectively alterable to provide a chosen one of multiple throw ratios.

An illustrative example takes the form of a portable image projection device, such as incorporated within a cell phone, laptop, PDA, pico projector or other similar portable device. The device has a housing, with first and second housing members pivotally attached for selective movement between a device folded position wherein the first member is generally aligned with the second member, and a device unfolded position wherein the first member is generally perpendicular to the second member. A spatial light modulator, such as a DMD or LCOS device, having an array of individually addressable pixel light modulator elements is housed within the first member. First lens optics (e.g., one or more refractive lenses) fixedly mounted within the first member is configured for projecting light modulated by the spatial light modulator along an optical axis through a first aperture with a first throw ratio (e.g., >2.0) when the device is in the folded position. Second lens optics (e.g., an aspheric mirror) is movably mounted within the first member for selective movement between a position of non-intersection with the optical axis and a position of intersection with the optical axis. The second lens optics is configured for cooperating with at least part of the first lens optics for projecting the light along the optical axis through a second aperture with a second throw ratio less than the first throw ratio (e.g., <1.1) when the device is in the unfolded position and the second lens optics is in the optical axis intersection position.

The second lens optics and the first aperture may be relatively positioned so that the first aperture is covered when the second lens optics is in the intersection position. Movement of the second lens optics may be accomplished by a slider attached to the second lens optics through a channel opening in the first member to enable the second lens optics to be manually moved between the non-intersection and intersection positions. The slider may be configured so that the first aperture is covered by the slider when the second lens optics is in the intersection position. Alternatively, movement of the second lens optics may be accomplished by an electrically powered mechanical member, such as by an electric motor which turns a threaded shaft to move the second lens element in translation.

The first and second members may have generally rectangular planar thin box-like configurations with the first member pivotally attached to the second member at one end side of the first member, the first aperture is located on an opposite end side of the first member, and the second aperture is located on a top generally rectangular surface of the first member. The configurations may operate so that, when the device is brought into its folded position with the second lens optics in its non-intersection position, the second member acts in generally coplanar relationship as a base to support the first member, e.g., on a tabletop with both first and second members oriented horizontally, for projecting images via the first lens optics at the longer throw ratio through the first aperture onto a vertical surface; and so that, when the device is brought into its unfolded position with the second lens optics in its intersection position, the second member acts in generally perpendicular relationship as a base to support the first member, e.g., on a tabletop with the first member oriented vertically and the second member oriented horizontally, for projecting images via the second lens optics and at least part of the first lens optics at a shorter throw ratio through the second aperture onto a horizontal surface.

For illumination of the spatial light modulator, the housing also includes a light source and control circuitry for controlling the settings of the individually addressable pixel light modulator elements. The circuitry may be configured to respond to a manually or automatically activated switch setting to change the settings of the modulator elements responsive to the folded and unfolded positions of the housing, and to the intersection and non-intersection positions of the second lens optics. The changes may include changing an orientation of the image, providing electronic correction of keystone distortion (viz., for tabletop projection), and other changes to suit individual needs and preferences.

BRIEF DESCRIPTION OF THE DRAWINGS

FIGS. 5A and 5B depict a modified mechanism for shifting lens optics between long throw ratio and short throw ratio positions.

DETAILED DESCRIPTION OF EXAMPLE EMBODIMENTS

Figure 1A:
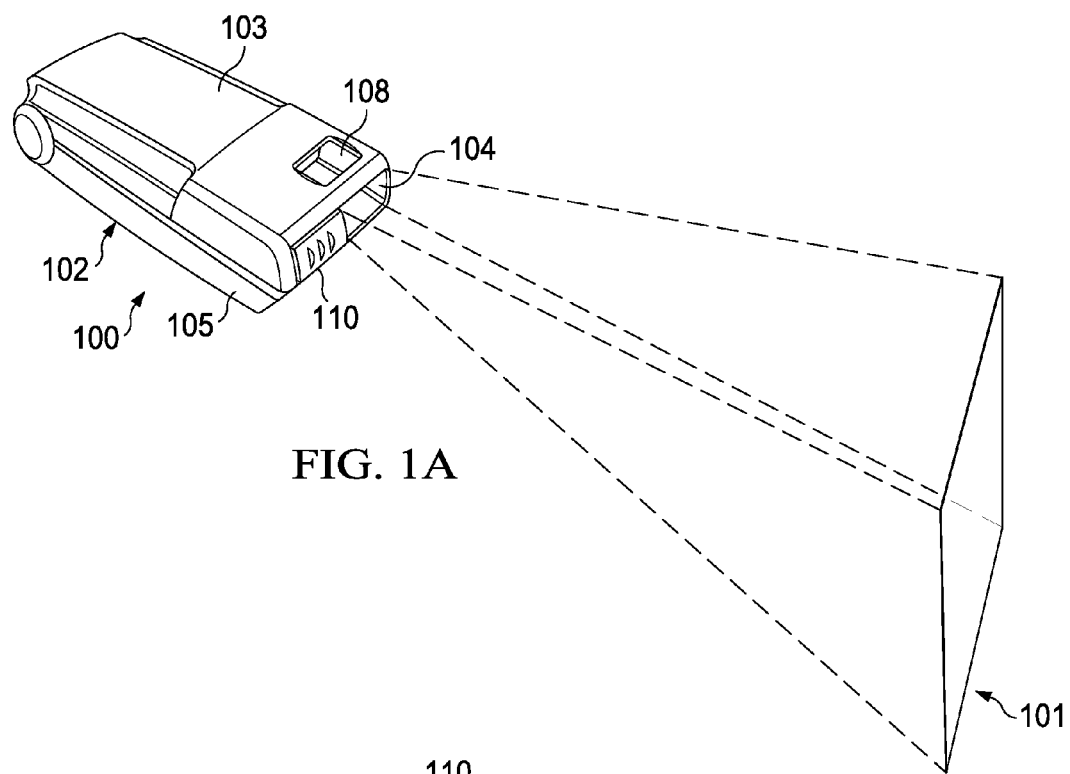
FIGS. 1A and 1B depict an example image projection device deployed in respective long throw ratio and short throw ratio projection positions.

FIGS. 1A, 1B, 2A and 2C illustrate an example image projection device 100, such as might be incorporated within a cell phone, laptop, PDA, pico projector or other portable image display device.

The device 100 has a housing 102 with a first housing member 103 pivotally attached to a second housing member 105 for selective movement between a device folded position (shown in FIG. 1A) wherein the first member 103 is generally aligned with the second member 105, and a device unfolded position (shown in FIG. 1B) wherein the first member 103 is generally perpendicular to the second member 105. A light source and a spatial light modulator, such as a DMD or LCOS device, having an array of individually addressable pixel light modulator elements are housed as a modular unit 107 within the first member 103. First lens optics 202 (e.g., including one or more refractive lenses) is fixedly mounted within the first member 103 and configured for projecting light modulated by the spatial light modulator along an optical axis 201 (FIG. 1A) through a first aperture 104 with a first throw ratio (e.g., >2.0) when the device is in the folded position. At least part of the first lens optics 202 may be incorporated into the modular unit 107. The modular unit may also include the control circuitry for controlling the settings of the individually addressable pixel light modulator elements.

Figure 1B:
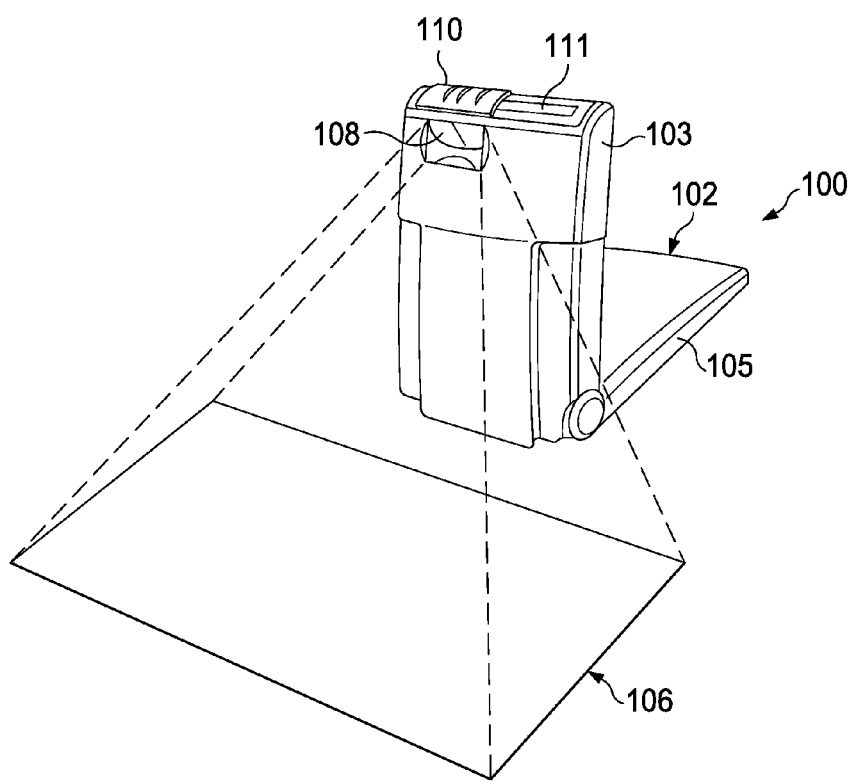
Figure 2A:
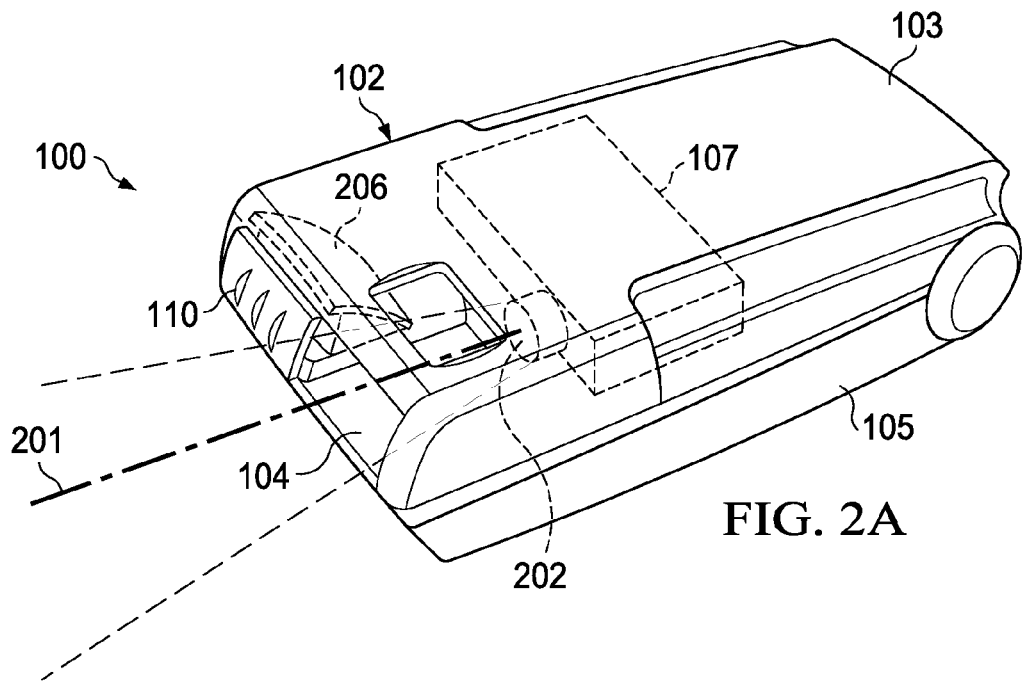
FIGS. 2A and 2B are more detailed views of the same device showing internal element positions.
Figure 2B:
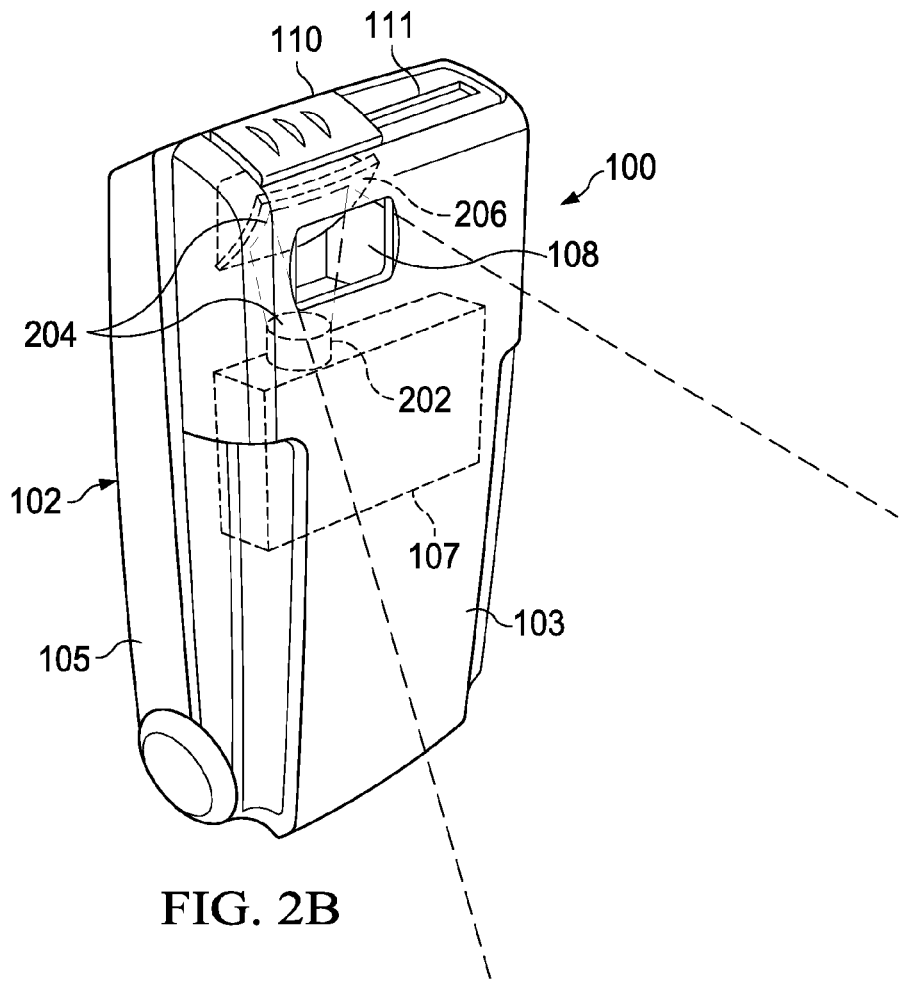

A second lens optics element 206 (e.g., an aspheric mirror) is movably mounted within the first member 103 for selective movement between a position of non-intersection with the optical axis (shown in FIGS. 1A and 2A) and a position of intersection with the optical axis (shown in FIGS. 1B and 2B). The second lens optics 206 is configured for cooperating with at least part of the first lens optics 202 to form a combined optics system 204 for projecting the light along the optical axis through a second aperture 108 with a second throw ratio less than the first throw ratio (e.g., <1.1) when the device is in the unfolded position and the second lens optics element 206 is moved into the optical axis intersection position.

The second lens optics element 206 and the first aperture 104 may be relatively positioned so that the first aperture 104 is covered when the second lens optics 206 is moved into its optical axis intersection position (see FIGS. 1B and 2B). Movement of the second lens optics element 206 may be accomplished by a slider 110 attached to the second lens optics element 206 through a channel 111 opening in the first member 103. The slider 110 is configured to enable the second lens optics element 206 to be manually moved between non-intersecting and intersecting positions with respect to optical axis 201. The slider 110 may be of a shape and dimension to fully cover the first aperture 104 when the element 206 is brought into the intersection position, and to leave the first aperture fully uncovered when the element 206 is brought into the non-intersection position. Alternatively, movement of the second lens optics 206 may be accomplished by an electrically powered mechanical member, such as by an electric motor which turns a threaded shaft to move the element 206 in translation or which acts to move the element 206 by pivoting.

In the illustrated example, first and second members 103, 105 have generally rectangular planar thin box-like configurations with the first member 103 pivotally attached to the second member 105 at one end side of the first member 103. The illustrated first aperture 104 is located on an end side of the first member 103, opposite the end side of pivotal attachment with the second member 105. The illustrated second aperture is located on a top generally rectangular surface of the first member 103. The configurations of the first and second members 103, 105 operate so that, when the device 100 is brought into the folded position with the second lens optics element 206 in its non-intersection position, the second member 105 moves into generally coplanar relationship with the first member 103 and acts as a base to support the first member, e.g., on a tabletop with both first and second members oriented horizontally. In this mode, images are projected via the fixed first lens optics 202 with the longer throw ratio through the first aperture 104 onto a vertical surface 101 as shown in FIG. 1A. The configurations of members 103, 105 also operate so that, when the device 100 is brought into its unfolded position with the second lens optics element 206 in its intersection position, the second member 105 moves into a generally perpendicular relationship with the first member 103 and acts as a base to support the first member 103, e.g., on a tabletop with the first member 103 oriented vertically and the second member 105 oriented horizontally, for projecting images via the combined first and second lens optics 204 with the shorter throw ratio through the second aperture 108 onto a horizontal surface 106. The circuitry in the unit 107 may be configured to respond to a manually or automatically activated switch to change the settings of the modulator elements responsive to movement of member 103, 105 between their folded and unfolded positions, and to movement of element 206 between its intersection and non-intersection positions. The setting changes may include remapping the correlations between pixel data in the input image signal and positions of the individual modulator elements in the spatial light modulator array to change an orientation of the projected image, to provide electronic correction of keystone distortion (viz., for tabletop projection), and to provide other modifications to the projected image to suit individual needs and preferences.

The projection operations shown in FIG. 1A and FIG. 1B are merely examples of operation of the device 100 in the long and short throw ratio modes. The long throw mode brought about by projecting the image through the long throw ratio optics 202 may, of course, be used to project the image onto surfaces other than the illustrated vertical surface 101 and with the device in other than the folded position. The device 100 could, for example, be brought into its unfolded position with member 103, 105 oriented relatively perpendicular as shown in FIG. 1B, but with the slider 110 in its optical axis non-intersecting position as shown in FIG. 1A. In such a manner of operation, member 105 could, for example, be positioned horizontally on a tabletop to provide support for member 103 pivoted into a vertical position for projecting images upwardly with the long throw ratio through the uncovered aperture 104. Likewise, the short throw mode brought about by projecting the image through the combined short throw ratio optics 204 may be used to project the image onto surfaces other than the horizontal surface 106 and with the device in other than the unfolded position. The device 100 could, for example, be a handheld device manually held in its folded position with the slider 110 moved over the aperture 104 as shown in FIG. 1B, for projection of images through the second aperture 108 onto a nearby vertical surface.

The optics configurations shown in FIGS. 2A and 2B are also merely examples of configurations for first and second lens optics. The illustrated first lens optics 202 has elements housed within first member 103 and incorporated within the projector module 107. Projector module 107 may, for example, be a projection module similar to commercially available pico projection modules having a low dimensional format and of a type suitable for optional incorporation within a cell phone, laptop, PDA or the like housing. In the shown arrangement, all elements for the long throw ratio projection may be included with the module. In other arrangements, some elements for the long throw ratio projection may be separately located within the aperture 104 opening or elsewhere. The illustrated second lens optics 206 is shown as a representative aspheric mirror element movable into position to intersect light from the part of first lens optics 202 included with the module 107. The short throw ratio projection is achieved by combining this movable lens element (viz. aspheric mirror) with the long throw ratio elements of module 107 to provide a combination of elements 204 providing the short throw projection path. The second lens optics 206 may, however, include different and/or additional one or more lenses or mirrors (collectively lens elements), such as one or more lens elements separately located in fixed position within the aperture 108. For the illustrated arrangement, the aspheric mirror 206 is located and dimensioned so that, when the slider 110 is brought into the position shown in FIG. 1B, the projected image is brought into focus with a short throw ratio onto a horizontal surface even with a corresponding horizontal surface bottom surface of the second member 105.

Figure 3A:
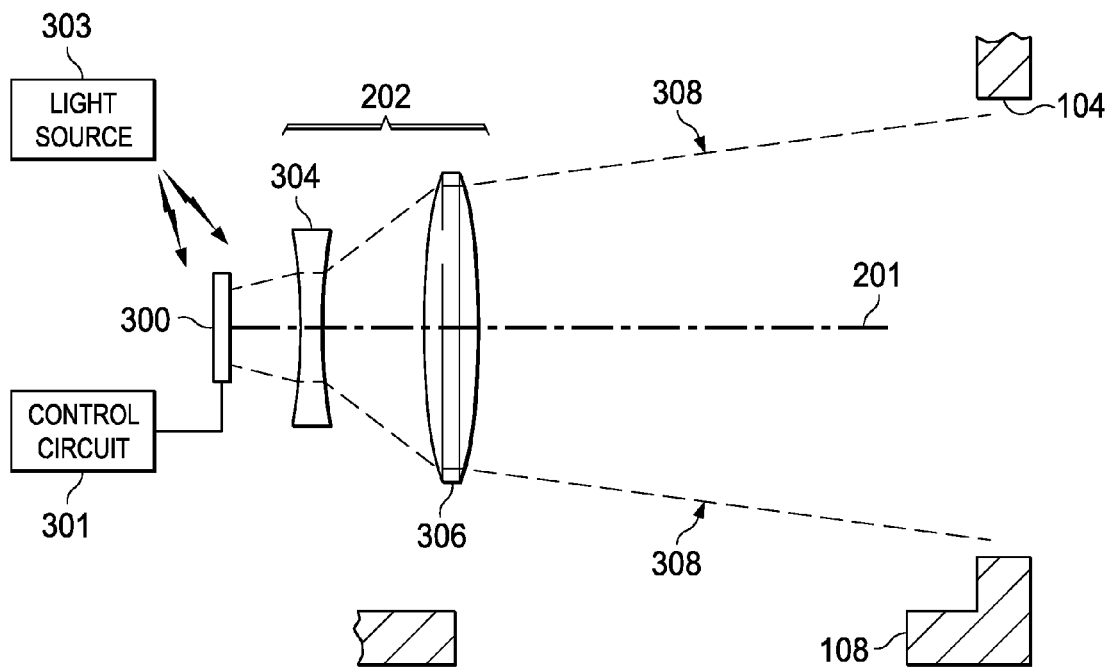
FIGS. 3A and 3B illustrate relative spatial light modulator and lens optics element placements for long throw ratio and short throw ratio image projections.
Figure 3B:
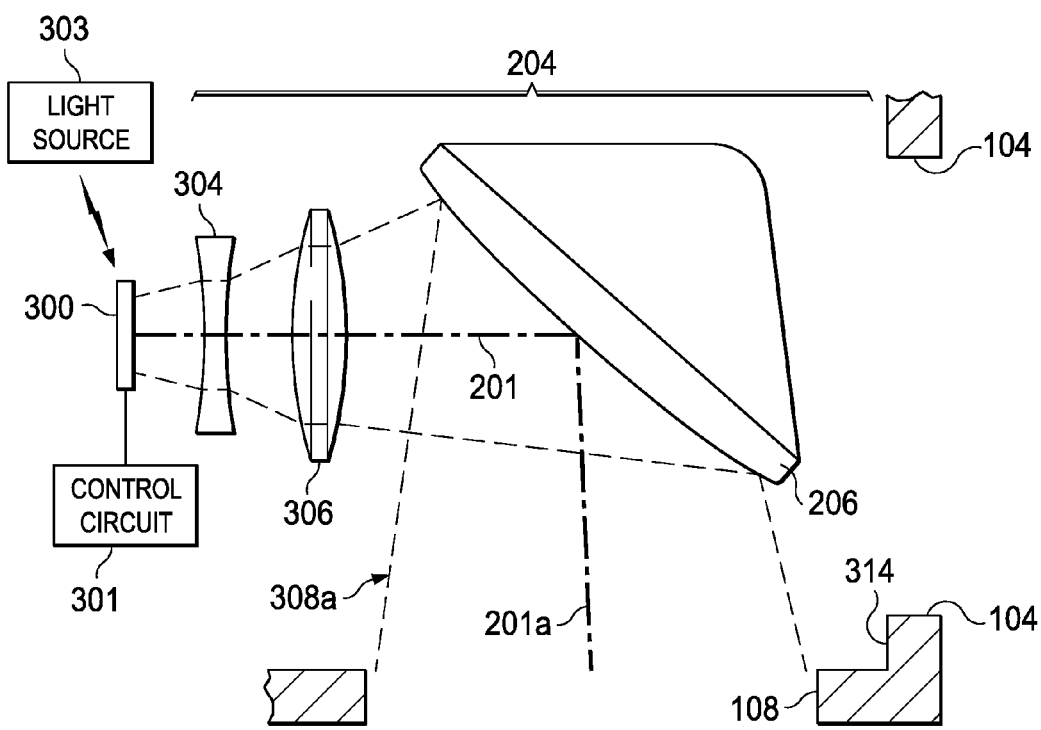

FIGS. 3A and 3B depict components used in projecting images in the long throw ratio and short throw ratio modes of operation, respectively.

The illustrated embodiment uses a spatial light modulator 300 common to both modes of operation that has an array of pixel light modulator elements which can be individually set by control circuitry 301 to modulate light from a light source 303. Modulator 300 may, for example, be a Texas Instruments DLP™ DMD device having an array of micromirrors which can be individually set to "ON" (pixel imaging) or "OFF" (pixel non-imaging) positions to modulate light incident from light source 303 with duty cycles established by look-up tables and/or algorithms based on pixel hue and intensity information in an image input signal. Projection of the modulated light from the spatial light modulator 300 to an image display surface (e.g., screen 101 in FIG. 1A) with a long throw ratio is accomplished using first lens optics 202 which includes one or more lens or mirror elements (collectively referred to herein as lens elements). By way of example, FIG. 3A shows negative and positive refractive lenses 304, 306 at spaced positions along the optical axis to direct modulated light 308 from the modulator 300 through aperture 104 onto the imaging surface. In the example embodiment, lenses 304, 306 are located in fixed positions within the first housing member 103. For lenses 304, 306 serving commonly for both the long throw ratio and short throw ratio projection modes, both elements may be incorporated with the module 107. Parts of first lens optics 202 used exclusively for the long throw ratio mode may be located at the aperture 104 or at other locations removing them from the optical path when the device is shifted into its short throw mode.

Projection of the modulated light from the spatial light modulator 300 to the image display surface (e.g., horizontal tabletop surface 106 in FIG. 1B) in the short throw ratio projection mode is accomplished using second lens optics which includes one or more lens elements which are movable into alignment with the optical axis 201. By way of example, FIG. 3B shows an aspheric mirror 206 that is moved into a position of intersecting alignment with axis 201 to supplement at least part of the first lens optics 202 and to form a combined optics system 204 with redirected axis portion 201a to direct modulated light 308a from the modulator 300 through aperture 108 with a short throw ratio onto the imaging surface. For the shown embodiment, lenses 304 and 306 of the first lens optics are used commonly in both the long throw ratio and short throw ratio optics systems. In other embodiments, additional fixed and/or movable lens elements may be included in the second lens optics, such as for example another positive or negative refractive lens fixed at aperture 108. The mirror lens element 206 may be a reflective surface on a face of a body that blocks the ingress/egress of light through aperture 104 when the element 206 is brought into alignment with the optical axis 201. for imaging in the common to both the long throw mode projection optics and the short throw mode projection optical path. fixed element into a position which along the optical axis to direct modulated light 308 from the modulator 300 through aperture 104 onto the imaging surface. As shown in FIG. 3B, a mode sensor 316 may be electrically connected to control circuit 301 to detect movement of the mirror lens element 206 into the intersection position, thereby signaling a change between long throw ratio and short throw ratio modes, and enabling responsive mode-specific modifications to the spatial light modulator settings.

Figure 4A:
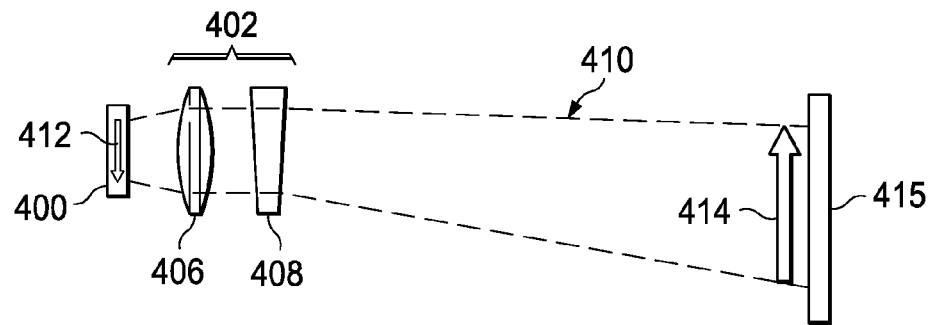
FIGS. 4A and 4B depict the projection of an example arrow image utilizing spatial light modulator and lens optics elements for long throw ratio and short throw ration projections.
Figure 4B:
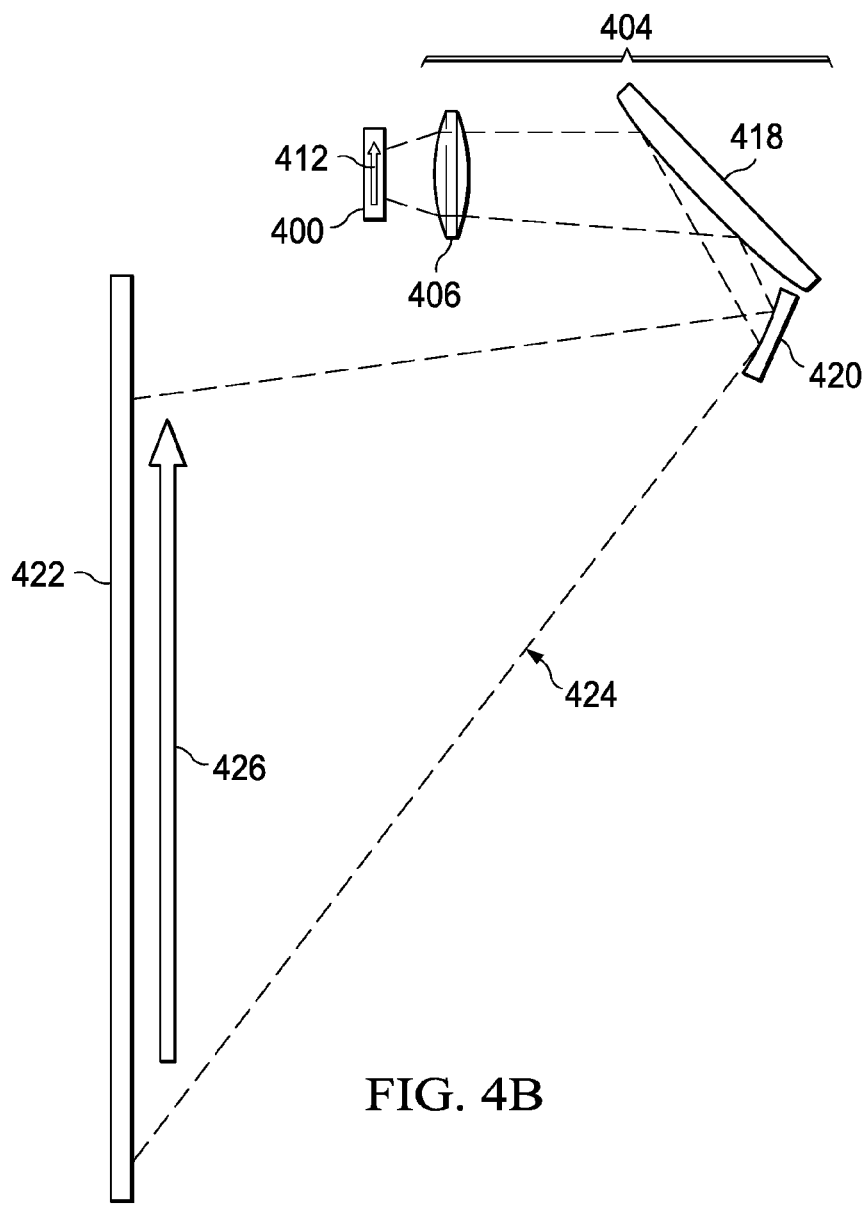

FIGS. 4A and 4B illustrate examples of other optics arrangements for long throw and short throw ratios modes of operation. FIG. 4A illustrates a first lens optics system 402 having at least one lens element 406 that is used in both modes of operation and at least one element 408 that is used only in the long throw ratio mode. For example, the element 406 may be fixed within the first housing member 103 incorporated with the module 107 and the element 408 may be fixed within the first housing member 103 at the aperture 104. FIG. 4B illustrates a second lens optics arrangement having at least one lens element (e.g., first aspheric mirror) 418 mounted within first housing member 103 for movement between optical axis intersection and non-intersection positions (e.g., by slider 110) and at lest one other lens element (e.g., second aspheric mirror) 420 mounted within first member 103 in fixed position at the aperture 108. For long throw ratio projection, light 410 modulated by modulator 400 to form an arrow image 412 is projected via lenses 406, 408 to form a corresponding arrow image 414 displayed on a first (viz., long throw) target surface 415. For short throw projection, mirror 418 is shifted into an optical axis intersecting position between lenses 406, 408, so that light 424 modulated by modulator 400 to form arrow image 412 is projected via lens 406, mirror 418 and mirror 420 to form the corresponding image 426 displayed on a different (short throw) target surface 422. As illustrated by the vertically flipped positions in FIGS. 4A and 4B of the arrows 412 formed at the spatial light modulator 400, switching from one projection mode to the other may be accompanied by corresponding changes in the manner of controlling the settings for the pixel modulator elements in the modulator array.

FIGS. 5A and 5B depict one example of an alternative mechanism for switching between long and short throw ratio projection modes. In the depicted arrangement, a spatial light modulator 500 and a common lens element 504 are located in spaced fixed positions within the first housing member 103 and other lens elements are located for movement into and out of alignment with the optical path. FIG. 5A shows an additional lens element 506 in a position of optical alignment with the modulator 500 and common lens element 504 for projection using the long throw ratio. FIG. 5A also shows additional lens elements 508, 510 in positions of non-alignment with modulator 500 and common lens element 504. With the elements positioned as shown in FIG. 5A, light modulated by modulator 500 is focused with a long throw ratio via lenses 504, 506 through aperture 104 onto the target surface, with no modulated light impinging on short throw optics elements 508, 510. FIG. 5B shows the additional lens element 506 shifted out of optical alignment and into a position of non-intersection with the projection optical axis. FIG. 5B also shows additional lens elements 508, 510 (illustrated as a refractive lens and an aspheric mirror) moved from non-alignment into positions of alignment with the optical axis. With the elements positioned as shown in FIG. 5B, light modulated by modulator 500 is focused with a short throw ratio via common lens 504, refractive lens 508 and aspheric mirror 510 through aperture 108 onto the target surface, with no modulated light impinging on element 506. The long throw ratio lens element 506 and short throw lens elements 508, 510 are shown mounted at spaced locations on a lens carrier 518. A threaded rod 516 mounted on a guide 520 fixed within first housing member 103 is rotated by a motor 514. The rod 516 passes through the carrier 518 in a manner to move the carrier laterally in translation relative to guide 520 when the rod rotates, thereby shifting the lens elements between their intersection and non-intersection positions.

Figure 6:
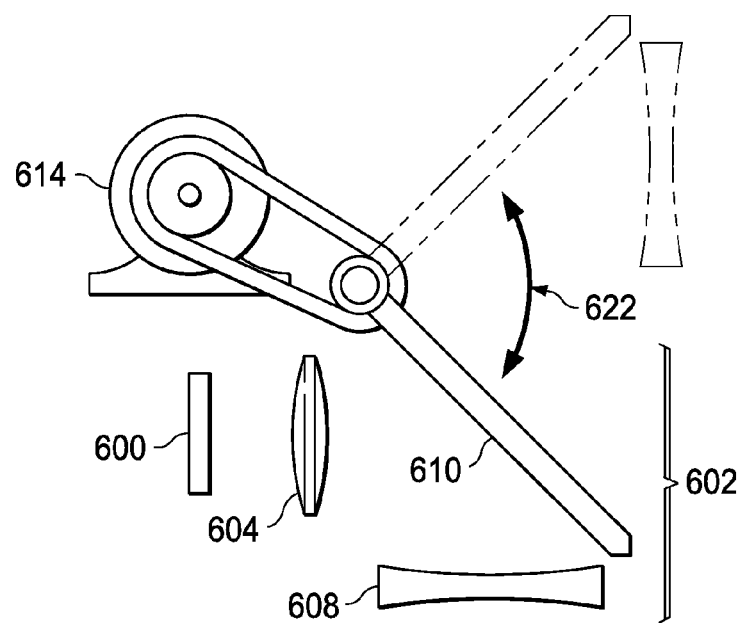
FIG. 6 depicts another modified mechanism for shifting lens optics between long throw ratio and short throw ratio positions.

FIG. 6 depicts another example alternative mechanism for switching between long and short throw ratio projection modes. In this arrangement, a spatial light modulator 600 and a common lens element 604 are located in spaced fixed positions within the first housing member 103 and other lens elements comprising a refractive lens 608 and mirror 610 are located for movement into and out of alignment with the optical path by pivoting indicated by arrow 622 under drive force of a motor 614. With the movable elements 608, 610 pivoted to the non-intersection positions indicated in phantom by dot-dot-dashed lines in FIG. 6, light modulated by modulator 600 is focused with a long throw ratio via lens 604 through aperture 104 onto the target surface, with optics elements 608, 610 removed from the light path. With the movable elements 608, 610 pivoted to the -intersection positions indicated in solid lines in FIG. 6, light modulated by modulator 600 is focused with a short throw ratio via lens 604, mirror 610 and lens 608 through lens aperture 108 onto the target surface.

Figure 7:
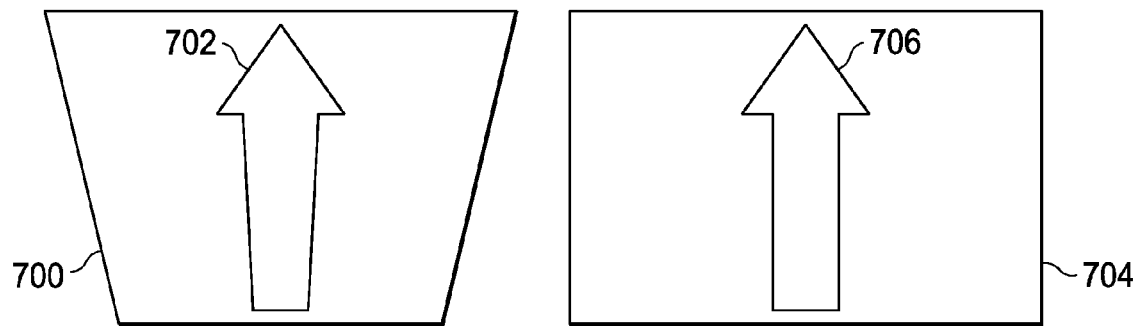
FIG. 7 depicts projected images before and after electronic image keystone correction.

FIG. 7 illustrate electronic image correction applied to the source image for varying the settings of the pixel modulator elements to accommodate the different projection modes. For example, an image projected onto a long throw surface through, for example, aperture 104 using a long throw ratio projection mode as illustrated in FIG. 1A may appear distorted as shown in the left view of FIG. 7 if projected without alteration through, for example, aperture 108 using a short throw ratio projection mode as illustrated in FIG. 1B. The image 700 of the arrow 702 may, for example, be wider at a top edge than at a bottom edge, exhibiting a distortion commonly referred to as keystoning. This can be corrected by progressive lengthening of the width from the top to the bottom of the image to provide a corrected image 704 of a corrected arrow 706 as shown by the right view in FIG. 7. Such correction may be applied electronically to provide different settings of the modulator elements corresponding to different settings of the projection modes.

Those skilled in the art to which the invention relates will appreciate that variations may be made to the described example implementations and other implementations realized within the scope of the claimed invention.

What is claimed is:

1. An image projection device, comprising:
a housing;
an array of individually addressable pixel light modulator elements positioned in the housing;
long throw ratio optical elements fixed within the housing for projecting light from the array along an optical path through a first aperture for imaging with a throw ratio of greater than 2.0;
at least one short throw ratio optical element configured when in the optical path with at least one of the long throw ratio optical elements for projecting the light from the array along a modified optical path through a second aperture for imaging with a throw ratio of less than 1.1;
a shifting member for selectively moving the at least one short throw optical element between positions of non-intersection and intersection with the optical path; and
circuitry for changing the settings of the spatial light modulator responsive to changes in positioning of the at least one short throw optical element.

2. The device of claim 1, wherein the shifting member includes a slider which covers the first aperture when the at least one short throw optical element is in the intersection position.

3. The device of claim 2, wherein the slider is attached to the at least one short throw optical element through a slot in the housing.

4. The device of claim 1, wherein the shifting member is configured for manual operation from outside the housing.

5. The device of claim 1, wherein the shifting member is electrically powered.

6. The device of claim 1, wherein the at least one short throw ratio optical element comprises an aspheric mirror.

7. The device of claim 6, wherein the at least one of the long throw ratio optical elements includes a refractive lens.

8. The device of claim 1, wherein the first and second apertures are on different ones of a top and side of the housing.

9. The device of claim 1, wherein the circuitry changes the settings to change an orientation of the image responsive to the changes in positioning.

10. The device of claim 9, wherein the circuitry changes the settings to provide electronic correction of a keystone distortion when the at least one short throw optical element is moved into the intersection position.

11. A portable image projection device, including:
a housing having first and second members pivotally attached for selective movement between a device folded position wherein the first member is generally aligned with the second member, and a device unfolded position wherein the first member is generally perpendicular to the second member;
a spatial light modulator housed within the first member;
first lens optics fixedly mounted within the first member; the first lens optics being configured for projecting light modulated by the spatial light modulator along an optical axis through a first aperture with a first throw ratio when the first and second members are in the folded position; and
second lens optics movably mounted within the first member for selective movement between a position of non-intersection with the optical axis and a position of intersection with the optical axis; the second lens optics being configured for cooperating with at least a part of the first lens optics for projecting the light modulated by the spatial light modulator along the optical axis through a second aperture with a second throw ratio less than the first throw ratio when the first and second members are in the unfolded position and the second lens optics is in the intersection position.

12. The device of claim 11, wherein the second lens optics and first aperture are relatively positioned so that the first aperture is covered when the second lens optics is in the intersection position.

13. The device of claim 12, further including a slider attached to the second lens optics through a channel opening in the first member for manually moving the second lens optics between the non-intersection and intersection positions.

14. The device of claim 13, wherein the first aperture is covered by the slider when the second lens optics is in the intersection position.

15. The device of claim 14, wherein the first aperture is located on a side of the first member, and the second aperture is located on a top of the first member.

16. The device of claim 15, wherein the device is a cell phone and the spatial light modulator is a digital micromirror device (DMD).

17. The device of claim 11, further including a slider attached to the second lens optics through a channel opening in the first member for manually moving the second lens optics between the non-intersection and intersection positions.

18. The device of claim 17, wherein the first aperture is covered by the slider when the second lens optics is in the intersection position.

19. The device of claim 11, wherein the first aperture is located on a side of the first member, and the second aperture is located on a top of the first member.

* * * * *